US008428394B2

(12) United States Patent
Krieter

(10) Patent No.: US 8,428,394 B2
(45) Date of Patent: Apr. 23, 2013

(54) SYSTEM AND METHOD FOR RESOLVING SPATIAL ORIENTATION USING INTELLIGENT OPTICAL SELECTIVITY

(76) Inventor: Marcus Krieter, Newport Beach, CA (US)

( * ) Notice: Subject to any disclaimer, the term of this patent is extended or adjusted under 35 U.S.C. 154(b) by 377 days.

(21) Appl. No.: 12/786,636

(22) Filed: May 25, 2010

(65) Prior Publication Data

US 2011/0293182 A1  Dec. 1, 2011

(51) Int. Cl.
*G06K 9/36* (2006.01)
*G06K 9/00* (2006.01)

(52) U.S. Cl.
USPC .......................... 382/291; 382/106; 382/286

(58) Field of Classification Search .......... 382/291, 382/286, 106; 705/150
See application file for complete search history.

(56) References Cited

U.S. PATENT DOCUMENTS

| | | | | |
|---|---|---|---|---|
| 4,568,159 | A * | 2/1986 | Baldwin | 351/210 |
| 6,323,942 | B1 | 11/2001 | Bamji | |
| 6,522,395 | B1 | 2/2003 | Bamji | |
| 6,741,279 | B1 * | 5/2004 | Allen | 348/239 |
| 6,870,608 | B2 * | 3/2005 | Detweiler et al. | 356/141.1 |
| 7,324,959 | B2 * | 1/2008 | Malkin et al. | 705/16 |
| 7,698,096 | B2 * | 4/2010 | Ohta | 702/151 |
| 7,716,008 | B2 * | 5/2010 | Ohta | 702/152 |
| 7,774,155 | B2 * | 8/2010 | Sato et al. | 702/127 |
| 2002/0048404 | A1 | 4/2002 | Fahraeus | |
| 2007/0182713 | A1 | 8/2007 | Kereth | |
| 2007/0211026 | A1 * | 9/2007 | Ohta | 345/158 |
| 2007/0211027 | A1 * | 9/2007 | Ohta | 345/158 |
| 2008/0044188 | A1 | 2/2008 | Kagawa | |
| 2008/0218728 | A1 | 9/2008 | Kirschner | |
| 2008/0318681 | A1 | 12/2008 | Rofougaran | |
| 2009/0231425 | A1 * | 9/2009 | Zalewski | 348/142 |
| 2011/0124410 | A1 * | 5/2011 | Mao et al. | 463/31 |

FOREIGN PATENT DOCUMENTS

| | | |
|---|---|---|
| WO | WO2008140710 A1 | 11/2008 |
| WO | WO2009012474 A1 | 1/2009 |
| WO | WO2009123750 A2 | 10/2009 |

OTHER PUBLICATIONS

Lee, J.C.; , "Hacking the Nintendo Wii Remote," Pervasive Computing, IEEE , vol. 7, No. 3, pp. 39-45, Jul.-Sep. 2008.*
Konig, Bernhard et al, Optimized Distance Measurement with 3D-CMOS Image Sensor and Real-Time Processing of the 3D Data for Applications in Automotive and Safety Engineering, Thesis; Universit at Duisburg-Essen; Jul. 2008.
Upendranath, Vanam, Smart CMOS Image Sensor for 3D Measurement, PhD Dissertation, University of Trento, Feb. 2005.

* cited by examiner

*Primary Examiner* — Bhavesh Mehta
*Assistant Examiner* — Utpal Shah
(74) *Attorney, Agent, or Firm* — Henry J. Cittone; Cittone & Chinta LLP

(57) ABSTRACT

The present invention provides a method and system for resolving complete free space orientation of an active receiving device at high speed using simple optics, trigonometry, simple circuitry, and using minimal processing power. The rapid triangulation of distance from the emitters, as well as resolution of rotational orientation, are determined by changing the contrast level in an infrared spectrum and by using wide angle lenses with greater than 180 degree hemispherical viewing angles. Furthermore, the system consists of an optional accelerometer, resident on the receiver, to dynamically adjust the image sensor frame rate.

14 Claims, 8 Drawing Sheets

Single Emitter Angle

Total View Field

Sensor Projection Area

View Field Coordinate Mapping

SYSTEM AND METHOD FOR RESOLVING SPATIAL ORIENTATION USING INTELLIGENT OPTICAL SELECTIVITY

FIELD OF INVENTION

The present invention relates to a method for resolving orientation information, and more particularly, to a method and system for rapidly detecting complete free space orientation of an active receiving device at high speeds, using an optical means.

BACKGROUND

'Spatial Resolution' describes the resolving power of any image-forming device and is expressed in a number of independent pixel values per unit of length. It is defined through various criteria such as the geometric properties of the imaging system and its ability to distinguish between target points. It depends on the properties of the system creating the image and not just the image resolution in pixels. For practical purposes, the clarity of the image is decided by its spatial resolution, and not the number of pixels in an image.

For example, the Nintendo Wii remote controller, active laser range finders, and standard CMOS sensors are some commonly known systems used for spatial resolution and image recognition.

Nintendo Wii remote controllers or the Nintendo Wii remote systems are widely video game peripheral devices used to find the orientation information of a receiver in video games. The target locater in these video games is generally attached to a base. These systems use a series of infrared emitters spaced apart at fixed distances. These emitters are detected by a simple planar array to provide a pointing capability for navigation of menus on a video monitor to which the Wii is connected. However, these devices have limitations, and can be easily damaged because of their bulky size. Further, the cost associated with these devices can be very high.

Active laser range finders use reflected energy of a laser that is placed at a known distance from the receiving sensor to determine the distance of a reflecting reference point.

A standard CMOS sensor, such as those typically found in webcams or cellular phones, are used to calculate the location of maximum energy of a requisite co-ordinate. This maximum energy location will appear as a dot that is brightest at a specific X and Y location on a matrix. The receiver could adjust its sensor's available onboard image processor settings to enhance easy detection of this dot. However, the standard CMOS sensor is susceptible to noise.

The limitations of the existing systems are not only that they provide limited abilities to resolve simple spatial orientations, but also, they are costly, bulky, require a large amount of processing power and use complex circuitry for operation. As a result the device has a limited angle range for detection.

In light of the foregoing discussion, there is a need for a simple method and system of rapidly detecting complete free space orientation of a receiving device, at high speed using simple circuitry and optics, and without consuming a lot of processing power.

BRIEF SUMMARY OF THE INVENTION

An object of the present invention is to provide a means to resolve complete free space orientation information of an active receiving device at high speed using simple circuitry and optics, and minimal processing power.

Another object of the present invention is to synchronize an emitter and a receiver using a wireless means such as an RF or IR transceiver, preferably in only two frames, which reduces the capture time and processing requirements significantly.

Yet another object of the present invention is to rapidly triangulate the dot by changing the contrast level in the infrared spectrum and by using wide angled fisheye lenses to identify the target accurately without using a complex image recognition system.

Yet another object of the present invention is to provide a method for resolving spatial orientation information of an active receiving device, the method comprising: transmitting a command from a host to a base; illuminating an emitter configured on the base upon receiving the command from the host; transmitting a pixel coordinate of an emitter pattern from the emitter to a receiver; translating optical rays incident on at least one fisheye lens configured on the receiver onto a first location on a image sensor; decoding the pixel coordinate of the emitter pattern by a receiver micro-controller unit; reporting the decoded pixel coordinate to the base; extinguishing the emitter on receipt of at least one decoded pixel coordinate from the receiver; resolving an optical reference points by the host from the decoded pixel coordinate; and calculating, based on the optical reference points, the distance and the spatial orientation.

Another object of the present invention is to provide a method for resolving spatial orientation information of an active receiving device, the method comprising: requesting, at a host device, a coordinate of an emitter; transmitting a command related to the coordinate from the host device to a base device via a first communication link; illuminating, at the base device, the emitter; transmitting the command from the base device to a receiver via a second communication link; triggering, at the receiver, a frame scan to determine a visible emitter coordinate; transmitting a response and the visible emitter coordinate from the receiver to the base device via the second communication link; disabling at the base device, the emitter; transmitting the response and the visible emitter coordinate from the base device to the host device via the first communication link; and processing, at the host device, the visible emitter coordinate.

Another object of the present invention is to provide a system for resolving spatial orientation using optical selectivity, comprising: a host; a base communicatively coupled to the host; at least one emitter mounted on the base, the emitter configured to report a coordinate of an emitter pattern from the base to a receiver; a data link between the base and the receiver; at least one image sensor mounted on the receiver; at least one lens configured to focus energy from the emitter onto the image sensor; and a microcontroller configured to initiate a single-frame capture from the image sensor.

To achieve the objects of the present invention, an embodiment of the present invention provides a system comprising a plurality of optical emitters comprising a plurality of reference points and a plurality of image sensors and associated lenses allowing emitted energy to be focused onto the sensor or sensors. An optional accelerometer placed on the receiver sensor is used to dynamically adjust the image sensor frame rate. A full duplex data link is established between the radio transceiver at the base and the radio transceiver at the receiver. A dedicated micro-controller unit (MCU) is used in conjunction with the base and the receiver for processing commands.

In another embodiment, this invention provides a method for the rapid resolution of complete free space orientation information of an active receiving device using simple optics and trigonometry is provided. The base receives a request from the host via a USB connection. The base will illuminate the emitter or emitters as requested by the host and then generate a command to report the coordinate or coordinates of the emitter pattern back to the base. An RF link is used for sending the command to the receiver for resolving the coordinates and then the base illuminates the emitter as instructed by the host. When the receiver decodes the command, it initiates a single frame captured from both of the image sensors and analyzes the resulting data. The coordinate or coordinates of the pixel or pixels that have the greatest magnitude of qualified energy, corresponding to the emitter's spectrum profile, is then transmitted back to the base. If no pixel qualifies with sufficient energy, then this information is sent as the response instead. Once the base is in receipt of this response, it extinguishes the previously illuminated emitter (s) and then reports the result to the host via its USB connection. To map the full motion with triangulated coordinate data, this process is repeated upon initiation by the host, at a rate up to the maximum frame rate of the image sensors or the system.

The preferred embodiment of the invention uses two sensors with two fisheye lenses that are opposite, but coaxially oriented to each other, and having a viewing angle greater than 180 degrees. This allows a complete 360 degree spherical viewing field to be covered at a radius sufficient to allow for the distance between the lens systems to be covered. This radius would increase, based on the mounting distance that may be designed to accommodate a handle. The distance would include distance between the lens systems, and any focal length distance between the image sensor and the lens system.

DETAILED DESCRIPTION OF THE EMBODIMENTS

Figure 1:
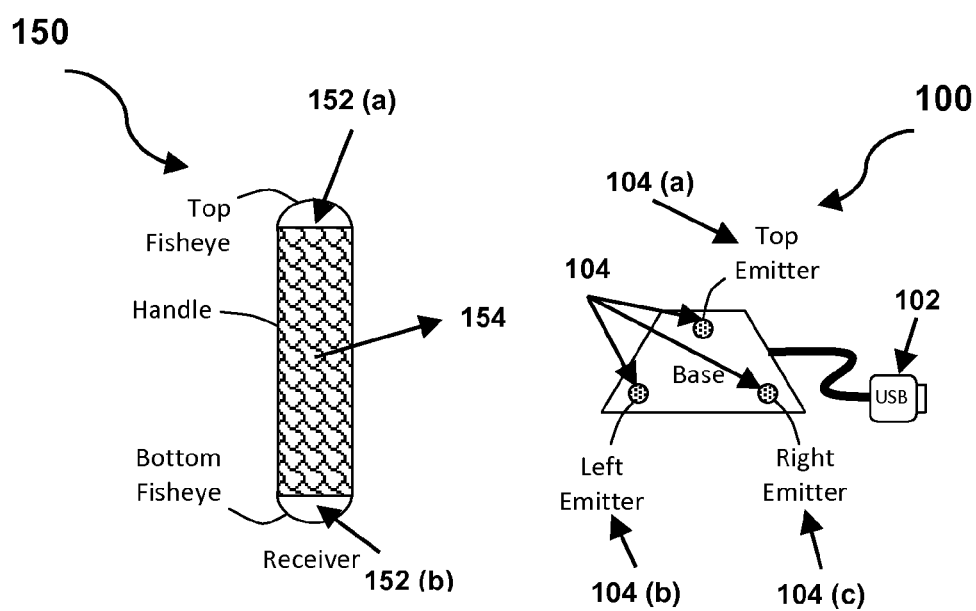
FIG. 1 is a schematic representation of a base and a receiver, in accordance with an embodiment of the present invention.

In the following detailed description of the embodiments of the invention, numerous specific details are set forth in order to provide a thorough understanding of the embodiments of the invention. However, it will be obvious to one skilled in the art, that the embodiments of the invention may be practiced without these specific details. In other instances well known methods, procedures, components and circuits have not been described in detail so as not to unnecessarily obscure aspects of the embodiments of the invention.

Furthermore, it will be clear that the invention is not limited to these embodiments only. Numerous modifications, changes, variations, substitutions and equivalents will be apparent to those skilled in the art, without parting from the spirit and the scope of the invention.

The embodiments of the invention provide a system and method to resolve complete free space orientation information of an active receiving device at high speed using simple circuitry, optics, trigonometry, and minimal processing power.

The system comprises of a stationary base, a mobile receiver, an active optical emitter comprising a single reference point, or a plurality of emitters comprising a plurality of reference points, an optical matrix sensor or a plurality of such sensors and associated lenses allowing emitter energy to be focused on the sensor, or sensors.

In an embodiment of the present invention, the emitters can be tuned to a brightness level, visual spectrum, or both to provide the receiver the ability to filter out unwanted visual data. The unwanted visual data may be background images, and other images that constitute noise. Furthermore, by changing the contrast level in the IR spectrum, the dot or the coordinate of the emitter pattern can be accurately identified without using a complex image recognition system.

In an embodiment of the present invention, the emitter patterns are synchronized at the beginning of each frame captured on the receiver sensor, preferably in only two frames. Once a frame is complete, the coordinates of the detected emitter dots on the receiver sensor are transmitted to the base. This reduces the capture time and the processing requirement significantly.

In an embodiment of the present invention, the receivers use variable frame capture intervals and the frame is synchronized with the base. A software application using the base is used to throttle down the frame rate for periods where slow, or no motion activity on the receiver is taking place. This is sensed by the statistical analysis of previous information, or by a simple accelerometer resident on the receiver. The simple accelerometer can send an alert to the base to increase its sampling rate. Additionally, by the use of very narrow band filtering, emitter matching, and prober contrast setting on the receiver imager sensor, it is also feasible that the output of the receiver image sensor could be monitored in real time such that once the dots have been resolved, the remainder of the sensor matrix scan could be truncated. Both variable frame control and frame truncation help in providing speed for resolving location data, and substantially reducing the cost and the power consumed by the system.

In a preferred embodiment of the present invention, the system utilizes two simple ultra wide-angle fisheye lenses (with greater than 180 degrees hemispherical viewing angle) to provide a complete spherical angle of detection without blind spots, or generation of ambiguous orientation results for handheld devices. Handheld devices may be a toy sword, a smart phone, a game controller, and other such items.

FIG. 1 is a schematic representation of a base and a receiver in accordance with an embodiment of the present invention. FIG. 1 illustrates the receiver 150 comprising a handle 154, a top wide angled fisheye lens 152(a) and a bottom wide angled Fisheye lens 152(b) with an extremely wide, spherical viewing field. The receiver 150 may be a toy sword, a smart phone, game controller or other such item.

The base 100 is stationary with respect to the receiver 150 and comprises of three emitters positioned at the top side 104(a), the left side 104(b) and the right side 104(c) of a triangle. The triangle is preferably an equilateral triangle. The base 100 is coupled to a universal serial bus 102 at one end wherein the universal serial bus 102 establishes communication between the microcontroller unit 206 and the host 300.

Figure 2:
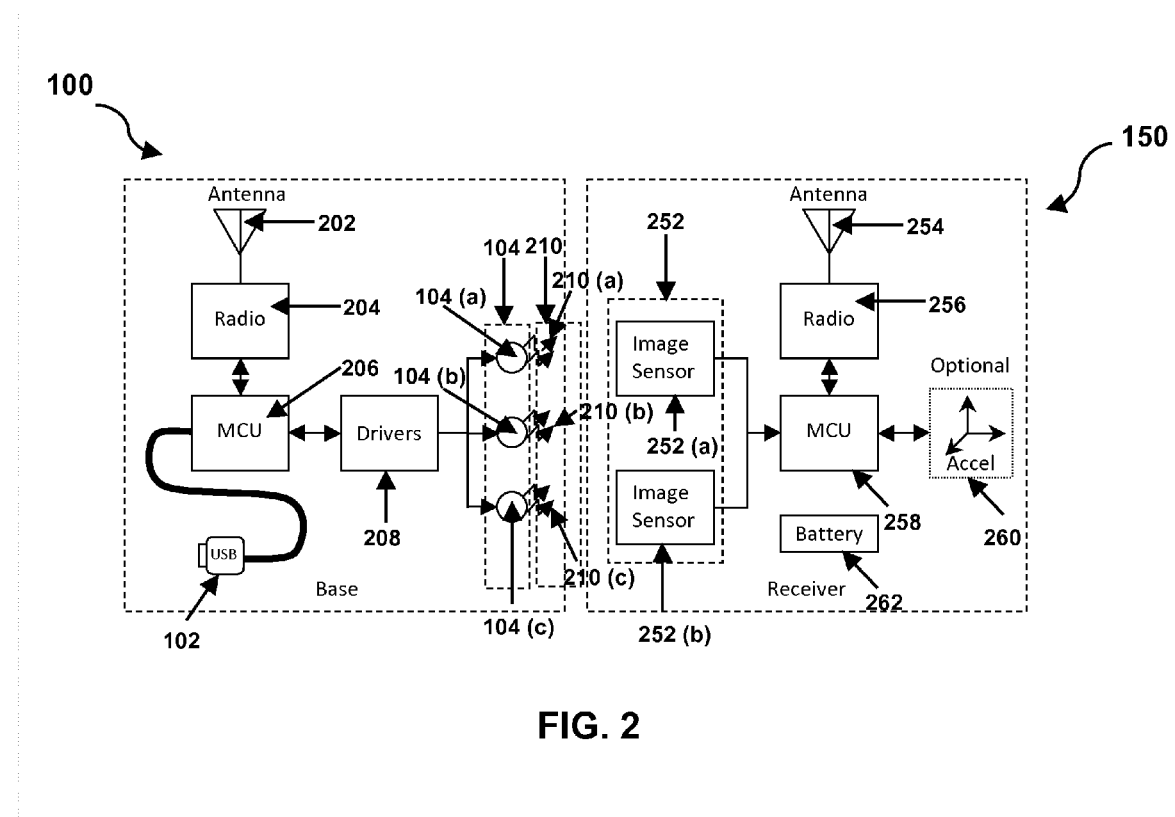
FIG. 2 is a block diagram showing the transfer of signals between the base and the receiver by radiofrequency means, in accordance with an embodiment of the present invention.

FIG. 2 is a block diagram showing the transfer of signals between the base and the receiver by radiofrequency means, in accordance with an embodiment of the present invention. FIG. 2 illustrates the base (as explained in conjunction with FIG. 1) 100 comprising the universal serial bus 102 coupled to a micro controller unit 206 used to process command from the host 300. The base 100 is engaged with a wireless processing means (not shown in FIG. 2) comprising a radio 204 coupled to an antenna 202.

In an exemplary embodiment of the present invention, when a query is raised by the user through host 300, the query is transmitted to the microcontroller unit 206 via the universal serial bus 102 in form of a command wherein the micro controller unit 206 is a computer-on-a-chip used to control electronic devices. The micro controller unit 206 transmits the query in the form of signal to the drivers 208, which then instructs and selects the plurality of the emitters 104 requested by the user. The emitters 104 then transmit the command to the receiver through a radio frequency (RF) link.

FIG. 2 further illustrates the receiver 150 powered by a battery 262, the receiver 150 comprises of a plurality of image sensors 252, which convert an optical image to an electric signal and are coupled to a micro controller unit 258. An optional accelerometer 260 is provided to dynamically adjust the image sensor frame rate. The receiver 150 further comprises of a wireless transmitting means comprising a radio 256, and an antenna 254 for transmitting radio frequency link from the receiver 150 to the base 100 and vice-versa. The radio transceiver in the base 204 and the radio transceiver in the receiver 256 are provided to establish a full duplex data link between the two so that an effective wireless communication is achieved.

In an exemplary embodiment of the present invention, the micro controller unit 206 on the base 100 may be MSP430 family device from Texas Instruments (TI), a 16-bit device. The micro controller unit 258 on the receiver 150 may be a general-purpose low-end digital signal processor (DSP) from TI, DM355 family, or a dedicated camera control processors from Zoran. The radio transceiver protocol may be a packet type radio having a custom protocol, or a low latency protocol based on an existing standard such as IEEE 802.15.4. However, examples mentioned herein are for exemplary purpose and may not be considered limiting to the invention.

In an embodiment of the present invention, FIG. 2 further comprises of the two-image sensors 252(a) and 252(b) that convert an optical image to an electric signal, in response to signal received from the base 100. The micro controller unit 258 samples a frame of data from each image sensor 252(a) and 252(b) and processes the command. The plurality of image sensor 252 is typical arrangement of a rectangular arrangement of picture elements known as pixels. The pixel receiving the most incident energy generated by the associated emitter is identified by its x and y matrix coordinate.

Figure 3:
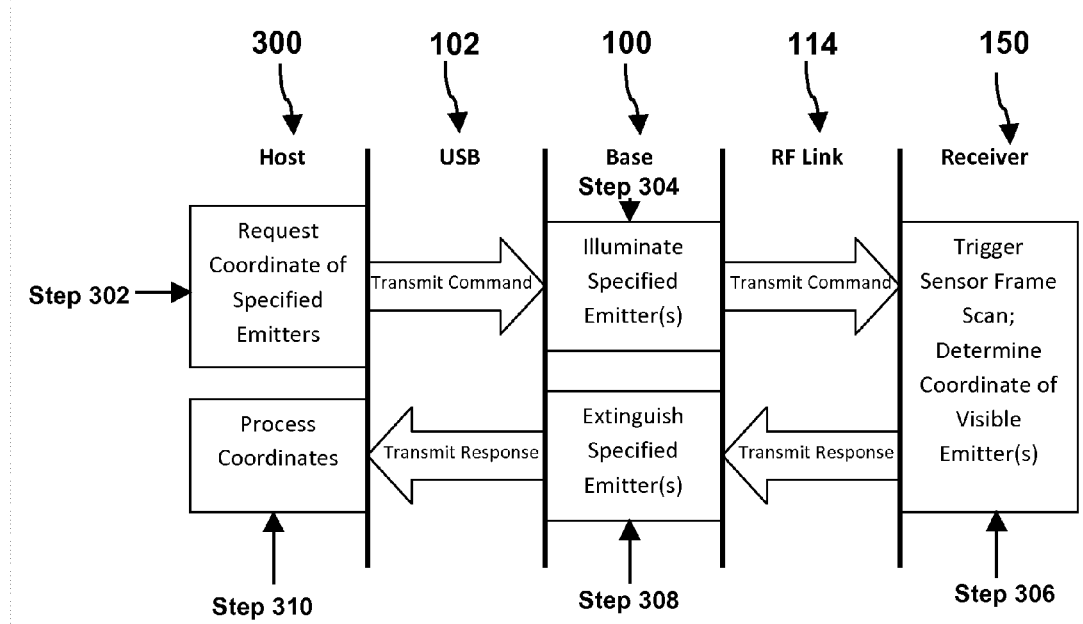
FIG. 3 is a flow diagram illustrating the method used by a system for complete free space orientation, associated with the system, in accordance with an embodiment of the present invention.

FIG. 3 is a flow diagram illustrating the method used for complete free space orientation associated with the system, in accordance with an embodiment of the present invention. Referring to FIG. 3, the necessary steps for providing such system as described above are shown. The method may include the following steps: step 302: The base 100 receives a request from the host 300 connected via the USB connection 102. Step 304: The base 100 illuminates the specified emitter 104 requested by the host 300 and generates a command to report the coordinate or coordinates of the emitter pattern back to the base 100. Step 306: The command is sent to the receiver 150 to resolve any coordinate via the radio frequency link 114. The receiver 150 decodes the command and initiates a single frame capture from each of the two image sensors 252 (a) and 252 and analyzes the resulting data. The coordinate or coordinates of the pixel or pixels that have the greatest magnitude of qualified energy corresponding to the emitter's spectrum profile is then transmitted back to the base 100. If no pixel qualifies with sufficient energy, then this is sent as the response instead. Step 308: The base 100, after receiving the response from the receiver 150, extinguishes the previously illuminated emitter 104 or emitters and reports the result to the host 300 via the USB connection 102. Step 310: Host 300 processes the coordinates and calculates the distance or the spatial orientation of the receiver in relative terms with respect to the base 100.

In another embodiment of the present invention, the relationship between the pixel coordinates on image sensor 252 and the emitter 104 constitute the method for calculating spatial orientation of the receiver 150 in relative terms with respect to the base 100.

The methodology illustrated in FIG. 3 is based on simple geometric triangulation principle. To map full motion with triangulated coordinate this process is repeated, upon initiation by the host 300, at a rate up to the maximum frame rate of the image sensors 252 or the system.

Figure 4:
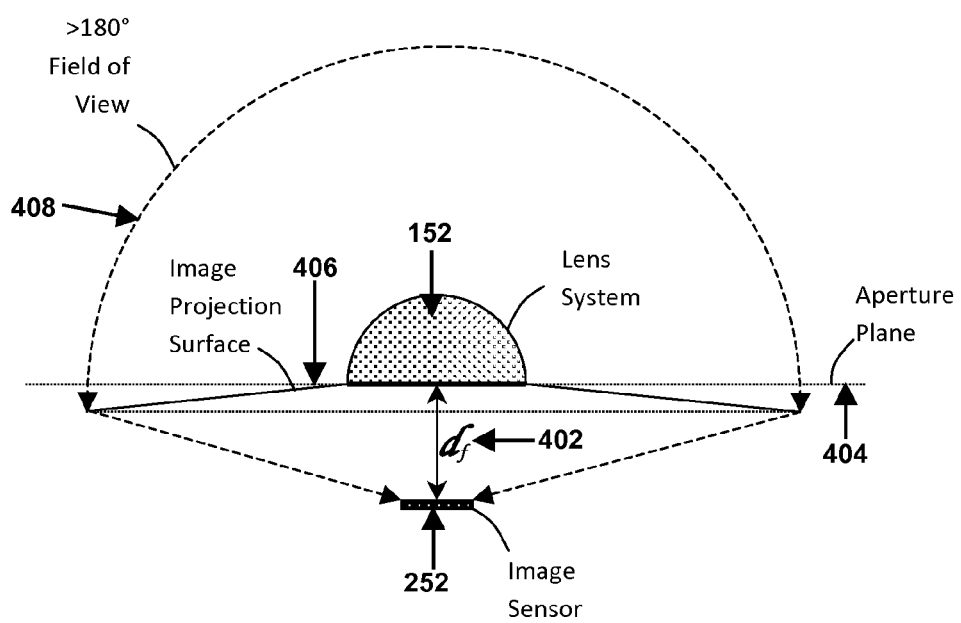
FIG. 4 is a schematic sectioned dimensional view of hemispherical lens system, in accordance with an embodiment of the present invention.

FIG. 4 is a schematic sectioned dimensional view of a hemispherical lens system 152, in accordance with an embodiment of the present invention. The hemispherical lens system 152 comprises of a duplex of fisheye lenses 152(a) and 152(b) (not shown in FIG. 4) positioned opposite to and co-axial from each other on the receiving device 150 viz. the sword handles etc. FIG. 4 further illustrates the hemispherical lens system 152, which translates all optical rays in a field of view 408 that are incident on the hemispherical lens system 152 on to a unique location on the sensor plane (not shown in FIG. 4). More specifically, the FIG. 4 shows a sectioned dimensional view of the hemispherical visual field 408 exceeding 180 degrees off an aperture surface. The aperture surface of an optical system is the opening that determines the cone angle of a bundle of rays that come to a focus in the image plane of the image sensor 252. This volume to planer translation of the lens system 152 is used to resolve relative distance and angular displacement between the base 100 and the receiver 150. Distance 402 herein, mentions the distance between the lens system 152 and the image sensor 252.

In an exemplary embodiment of the present invention, the volume to planer translation is common to the lens system 152. Examples of the lens system 400 may be robot vision, range finders and most other optical applications. It will be evident to a person skilled in the art that the lens system 152 as mentioned herein is for exemplary purpose and may not be considered limiting to the examples mentioned.

Figure 5:
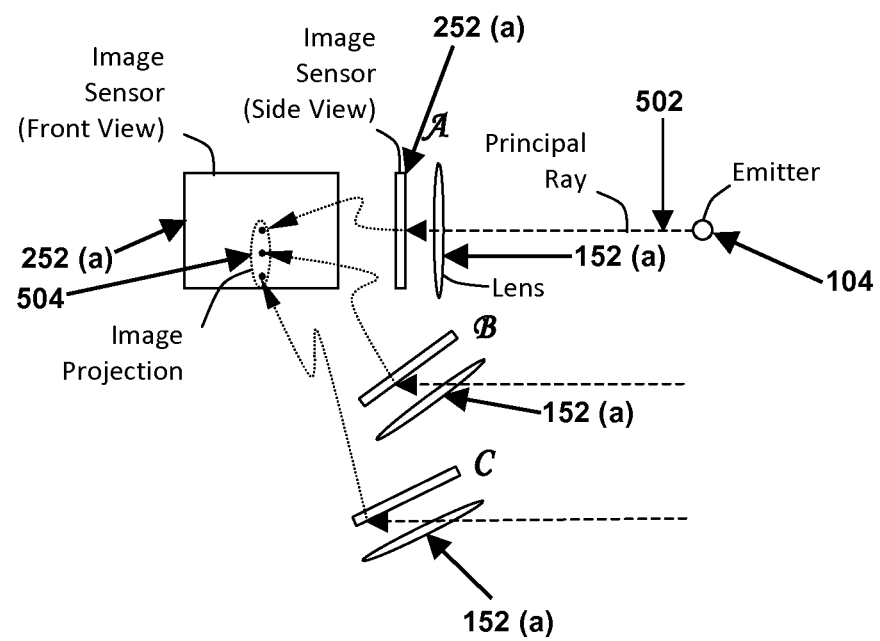
FIG. 5 illustrates a simple relationship between the single emitter and the single image sensor tuned to detect the emitter energy, in accordance with an embodiment of the present invention.

FIG. 5 illustrates a simple relationship between a single emitter 104 and the single image sensor 252(a) tuned to detect the emitter energy, in accordance with an embodiment of the present invention. FIG. 5 illustrates a lens 152(a) placed behind the image sensor 252(a) in a horizontal plane A. The movement of the lens 152(a) and the image sensor 252(a) in a simple arc represented by relative location A, B and C will result in corresponding projection of distinctly different coordinates 504 of primary incident image on the surface of the image sensor 252(a).

In another embodiment of the present invention, by extension, additional plurality of the emitters 104 located at known distances can be used to triangulate the distance from the emitters 104, as well as the rotational orientation. In an exemplary embodiment of the present invention, fisheye lens with greater than 180 degrees viewing angle that is low cost and suitable for use with low cost image sensor may be Sunsex DSL216A, having a 187 degrees hemispherical angle.

Figure 6:
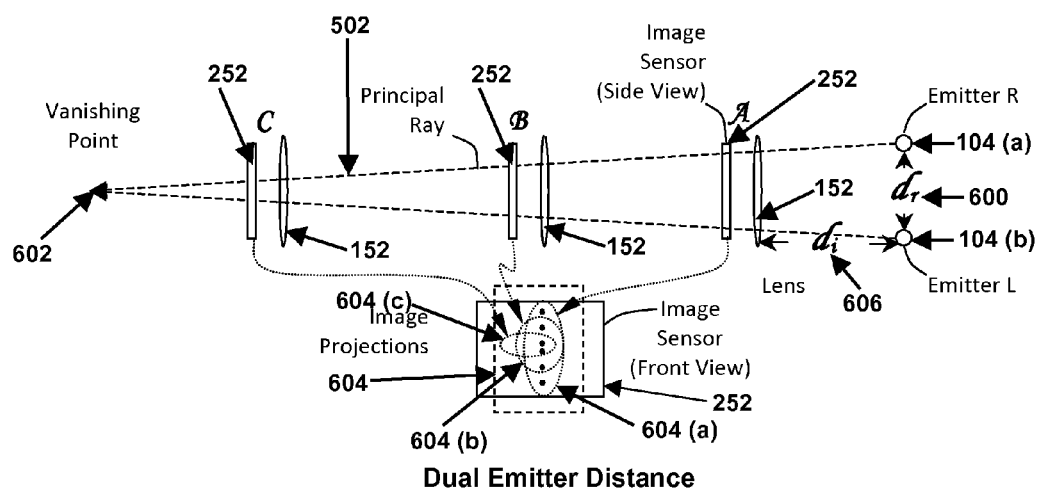
FIG. 6 shows the resolution of the image from two emitters using a common triangulation principle, in accordance with an embodiment of the present invention.

FIG. 6 shows the resolution of the image from the two emitters using a common triangulation principle, in accordance with an embodiment of the present invention. FIG. 6 further illustrates two emitters, the right emitter 104(a) and the left emitter 104(b), which are present at a known physical distance of 600 from each other. The primary rays are drawn from the emitter to the focal vanishing point 602. These rays will be projected on the receiver image sensor or sensors 252. The sensor 252 then causes a corresponding projection of primary incident image in different coordinates 604. At positions A, B and C the coordinates of the projected image are shown as 604 (a), 604 (b), and 604 (c) respectively. FIG. 6 further illustrates the relationship between distance within projected image coordinates and the distance 708, the distance between receivers 152 from emitter 104. The distance between the projected image coordinates 604 is directly proportional to the distance the receiver 150 is from emitter 104. At further distances, the coordinates of the sensed emitter image are inversely proportional to the distance of the receiver image sensor 252 from the base emitter 104.

In accordance with an exemplary embodiment of the present invention, by adding a third emitter 104(c) (not shown in the FIG. 6) in a position not in that plane, three dots would be projected on the image sensor and would correspondingly represent unique positions in all the three axis in front of the plane containing all the three emitters 104(a), 104(b) and 104(c) and the projected perpendicular from that plane.

Figure 7:
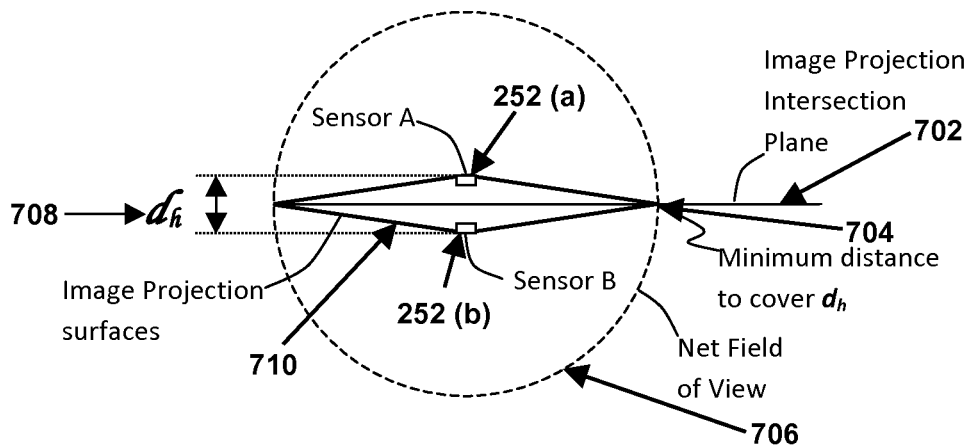
FIG. 7 illustrates a complete view field formed by the lens arrangement resident inside the receiver, in accordance with an embodiment of the present invention.

FIG. 7 illustrates a complete view field formed by the lens arrangement resident inside the receiver in accordance with an embodiment of the present invention.

FIG. 7 illustrates a duplex of image sensors, 252 (a) and 252(b) with two greater than 180 degree hemispherical viewing angle fisheye lenses (not shown in FIG. 7), arranged opposite and coaxial to each other. This allows a complete 360-degree spherical viewing field 706 to be covered at a radius sufficient to allow for the distance between the lens system h 708 to be covered. This radius would be increased based on the mounting distance that may be designed to accommodate a handle 154. The distance h, 708 would include this distance plus any focal length distance, such as shown in FIG. 4 as, 402.

Figure 8:
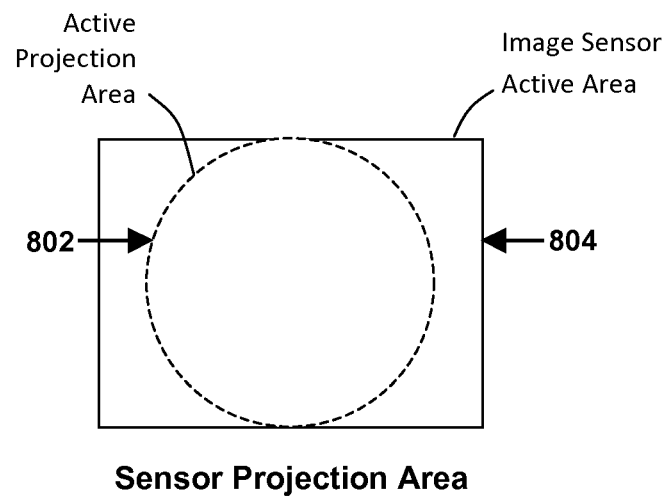
FIG. 8 depicts the sensor projection area, in accordance with an embodiment of the present invention.

FIG. 8 depicts the sensor projection area, in accordance with an embodiment of the present invention. FIG. 8 illustrates an active projection area 802 and an image sensor active area 804. Most optical sensors are rectangular arrays.

In a preferred embodiment of the present invention, the sensor is matched so that the entire visual field of the lens system 152 is projected on the sensor surface 252. Because of the geometrical differences, some unused area is encountered which is schematically shown in FIG. 8.

In another preferable embodiment of the invention, the receiver 150 utilizes two identical VGA or higher resolution optical sensors that are responsive to 850 nm near infrared band (NIR) energy. Most CMOS sensors used in low cost applications can be utilized provided their IR cut filtering is removed and replaced by a low pass, near infra red (NIR) filter. Other optical band filter outside NIR may be utilized. Furthermore, narrow band filtering can be eliminated, if additional content capture is necessary. However, this would require additional processing power to perform the filtering in firmware or software.

Figure 9:
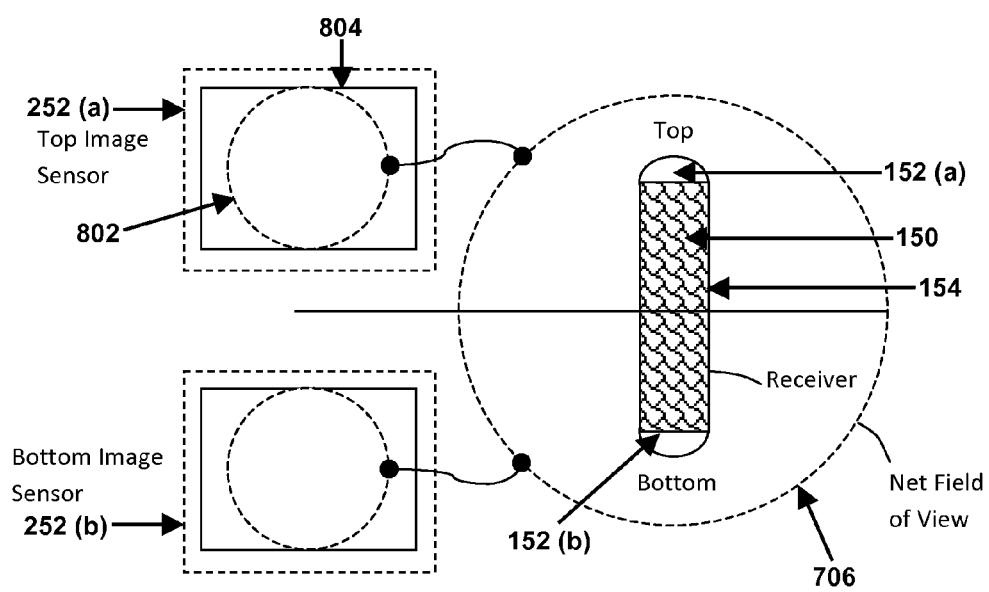
FIG. 9 illustrates a view field coordinate mapping, in accordance with an embodiment of the present invention.

FIG. 9 illustrates View Field Coordinate Mapping, in accordance with an embodiment of the present invention. FIG. 9 further illustrates the receiver 150 with the top end fisheye lens 152(a) and the bottom end fisheye lens 152(b). More specifically, the Figure illustrates that the top and bottom hemispherical volumes of the receiver 150 net field of view 706 would map into unique coordinates in their respective sensor 2D planes shown as the top image sensor 252(a) plane and the bottom image sensor 252(b).

In an embodiment of the present invention, the system and method used in this invention finds its application in video games, mobile devices, navigation devices, sensors, consumer products such as toys, wherein a particular system and method is used in collaboration with a transmitting means, to calculate distance and spatial orientation of an object. The key advantages of this system is it's very low cost of material, very low processing requirement, simple circuitry, simple optics and battery life advantage for mobile devices.

While the principles of the disclosure have been illustrated in relation to the exemplary embodiments shown herein, the principles of the disclosure are not limited thereto and include any modification, variation or permutation thereof.

What is claimed is:

1. odresolving spatial orientation information of an active receiving device, the method comprising:
   transmitting a command from a host to a base;
   illuminating an emitter configured o he base upon receiving the command from the host;
   transmitting a pixel coordinate of an emitter pattern from the emitter to a receiver;
   translating optical rays incident on at least one fisheye lens configured on the receiver onto a first location on a image sensor;
   decoding the pixel coordinate of the emitter pattern by a receiver micro-controller unit;
   reporting the decoded pixel coordinate to the base;
   extinguishing the emitter on receipt of at least one decoded pixel coordinate from the receiver;
   resolving an optical reference points, the host from the decoded pixel coordinate; and
   calculating, based on the optical reference points, the distance and the spatial orientation.

2. The method of claim 1, wherein the base includes a Universal Serial Bus, a base micro-controller unit, a driver, the emitter, and a transmitter.

3. The method of claim 2, wherein the Universal Serial Bus is configured to communicably couple the host and the base micro-controller unit.

4. The method of claim 1, wherein the receiver includes the at least one fisheye lens, the image sensor, the receiver micro-controller unit, a battery, and a transmitter.

5. The method of claim 1, further comprising the step of filtering out unwanted visual data by the receiver.

6. The method of claim 2, wherein the trunmitter includes antennaradio transceiver configured to transmit a radio frequency link.

7. The method of claim 1, whereinthe emitter is configured on a triangle,

8. The method of claim 1, wherein the base includes three emitters configured on vertices of an equilateral triangle.

9. A method for resolving spatial orientation information of an active receiving device, the method comprising:

requesting, at a host device, a coordinate of an emitter;

transmitting a command related to the coordinate from the host device to a base device via a first communication link;

illuminating, at the base device, the emitter;

transmitting the command from the base device to a receiver via a second communication link;

triggering, at the receiver, a frame scan to determine a visible emitter coordinate;

transmitting a response and the visible emitter coordinate from the receive to the base device via the second communication link;

disabling at the base device, the emitter;

transmitting the response and the visible emitter coordinate from e base device to the host device via the first communication link; and processing, at the host device, the isible emitter coordinate.

10. The method of claim 9, Wherein the first communication link is a Universal Serial Bus 11. The method of claim 9, wherein the second communication link is a radio-frequency link.

12. A system for resolving spatial orientation using optical selectivity, comprising:
   a host;
   a base communicatively coupled to the host wherein the base includes a Universal Serial Bus, the microcontroller unit, a driver, the emitter and a transmitter;
   at least one emitter mounted on the base, the emitter configured to report a coordinate of an emitter pattern from the base to a receiver;
   a data link between the base and the receiver; at least one lens configured to focus energy from the emitter onto the image sensor; and
   a microcontroller configured to initiate a single-frame capture from the image sensor.

13. The system of claim 12, wherein the transmitter includes an antenna and a radio transceiver.

14. A system for resolving spatial orientation using optical selectivity. comprising;
   a host;
   a base communicatively coupled to the host, wherein the base includes a Universal Serial Bus, the microcontroller unit, a driver, the emitter and a transmitter; at least one emitter mounted on the base, the emitter configured to report a coordinate of an emitter
   pattern from the base to a receiver;
   a data link between the base and the receiver;
   at least one image sensor mounted on each end of the receiver;
   at least one ultra-wide angle fisheye lens that focus energy from the emitter onto the image sensor and configured to provide a spherical angle of detection without blind spot emitter onto the image sensor and configured to provide a spherical angle of detection without blind spot; and a microcontroller configured to initiate a single-frame capture from the image sensor.

* * * * *